H. TEN WINKEL.
OIL PURIFIER AND SEPARATOR.
APPLICATION FILED SEPT. 26, 1917.

1,290,820.

Patented Jan. 7, 1919.

Inventor
Herman Ten Winkel.

By
Attorney the United States Patent Office.

HERMAN TEN WINKEL, OF DENVER, COLORADO.

OIL PURIFIER AND SEPARATOR.

1,290,820.  Specification of Letters Patent.  Patented Jan. 7, 1919.

Application filed September 26, 1917. Serial No. 193,267.

*To all whom it may concern:*

Be it known that I, HERMAN TEN WINKEL, a citizen of the United States, residing in the city and county of Denver and State of Colorado, have invented certain new and useful Improvements in Oil Purifiers and Separators; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to means for separating the impurities from the oil and water which are taken from the exhaust of engine plants and for separating the oil and water from each other, whereby both are made practically pure. In many plants where my improvement is adapted to be employed, the purification and saving of the water is exceedingly important and therefore, one of the primary objects in considering a machine of this character.

My present improvement over the construction disclosed in my prior Patent #985,961 dated March 7, 1911, relates more particularly to filtering features which facilitate the purification of the water as well as the separation of the oil from the water and foreign matter with which the oil and water are mingled when taken from the engine plant.

In my improvement I employ a filtering tank of special construction into which the water of condensation from the engine plant is discharged in the first instance. This tank includes a number of annularly arranged screen members, the innermost being spaced from a central compartment while the other members are properly spaced from each other, any desired number being employed to effectively perform the filtering function and properly retard the travel of the oil so that the water may flow ahead so to speak, of the oil through the apparatus until it reaches the main tank where the final separation takes place. The annularly arranged filtering screens of my improved filtering tank, are readily removable from the tank, which is an important advantage since these screens become clogged at intervals and must be cleaned in order to properly perform their function. In my improvement it is only necessary to remove any screen and substitute another therefor.

In the complete structure illustrated in the drawing three tanks are illustrated, one being the main separating tank and the other two may be termed filtering tanks. Each of these tanks, that is to say, both the filtering tanks and the main tank, are provided with stop screens or filters, whereby the discharge into the tank is filtered in the first instance thus initially removing any coarse foreign matter, and also serving to retard the travel of the oily element and allowing the water in the first instance to move ahead of the oil.

Having briefly outlined my improvement, I will proceed to describe the same in detail, reference being made to the accompanying drawing in which is illustrated an embodiment thereof. In this drawing.

The same reference characters indicate the same parts in all the views.

Figures 1, 4:
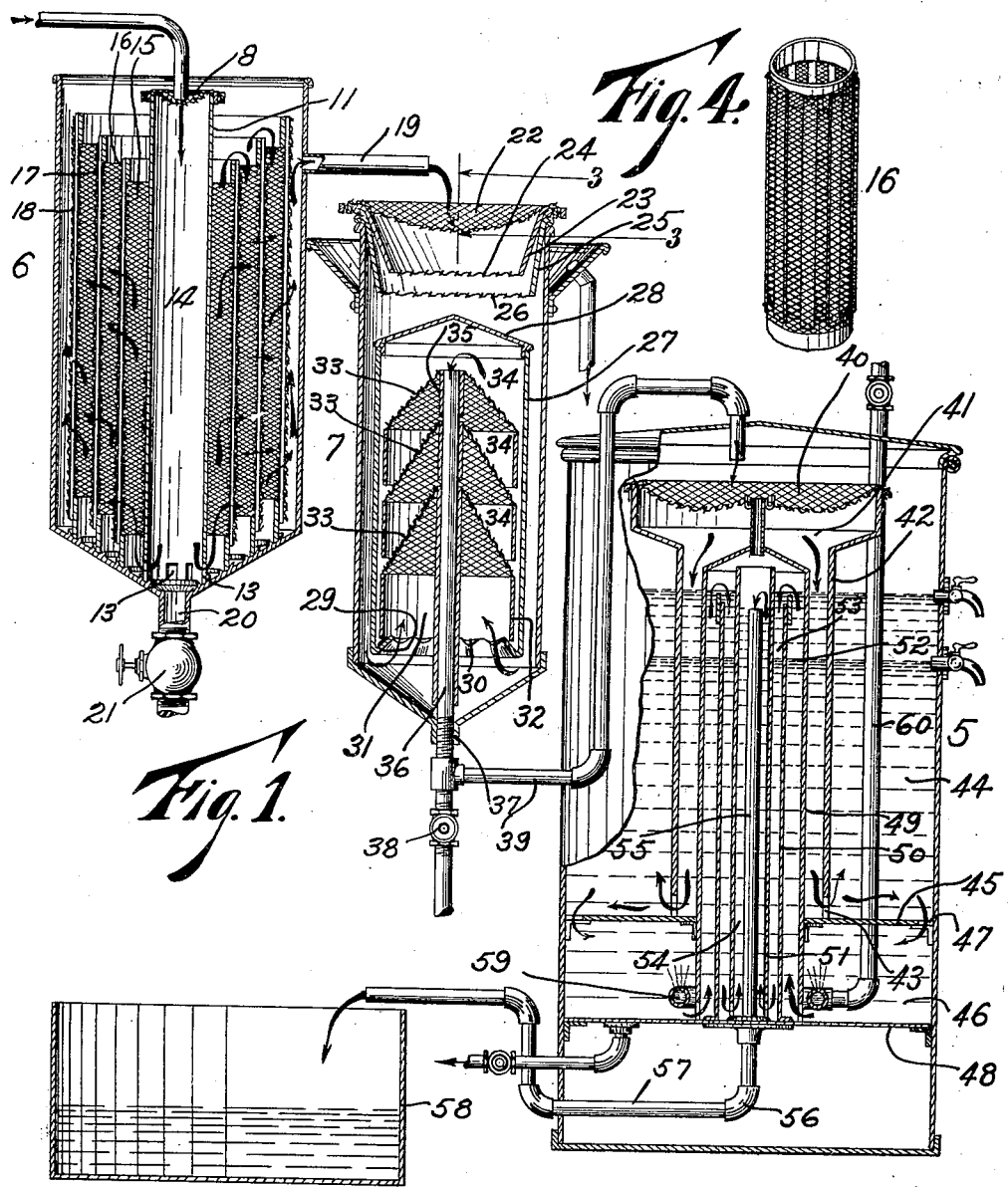
Figure 1 is a vertical, longitudinal section taken through the complete apparatus.
Fig. 4 is a fragmentary detail view of one of the annular filtering screens of the filtering tank.
Figure 2:
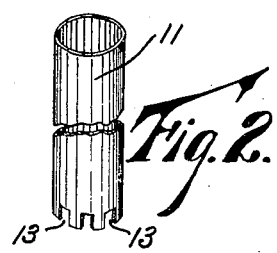
Fig. 2 is a detail view in perspective illustrating the central annular partition of the main filtering tank.
Figure 3:
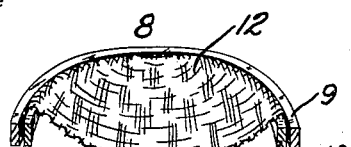
Fig. 3 is a fragmentary perspective view of one of the filtering screens with which each of the tanks is equipped.

Let the numeral 5 designate the main separating tank, 6 the main filtering tank and 7 a filtering tank interposed between the separating tank and the main filtering tank. The tank 6 is centrally provided with a cylindrical partition 11 whose top is provided with a filter 8 readily removable and preferably being held by applying a ring 9 to a similar ring 10 surrounding the upper extremity of the partition 11, the outer edge of the screen member 12 being clamped between the two rings 9 and 10. The lower extremity of the cylindrical partition 11 is provided with openings 13 to allow the material discharged into the compartment 14 to pass out of the bottom of said compartment into a compartment 15 formed by an annular filtering screen 16, there being two other screens respectively designated 17 and 18 arranged within the tank 6 and through which the material must pass before it can escape from the tank through an outlet conduit 19 which is connected with the upper extremity of the tank. The filtering screens 15, 16 and 17 are removably mounted in the tank in any suitable manner, whereby they may be readily removed and other screens substituted whenever they become clogged or need repair. The bottom of the tank 7 is provided with an outlet member 20 which is equipped with a valve 21 which may be opened whenever it is desired to clean the tank from sediment or the accumulation of impurities of any character.

The material after leaving the tank 7 through the pipe 19 falls on a filtering screen 22 which is applied to the top of a funnel-shaped member 23, in substantially the same manner as the screen member 12 is applied to the filtering hood 8. The funnel-shaped receiving member 23 is provided at the bottom with a screen 24 while outside of the filtering member 23 is located a second similar member 25 having a screen bottom 26 through which the material must pass before entering the tank 7 within which is located an annularly arranged partition 27 closed at the top by a diaphragm 28. The bottom of the annular partition 27 is provided with an upturned edge 29 surrounding an opening 30 through which the material rises and passes into a compartment 31 surrounded by a partition 32, to the top of which is secured a cone-shaped filtering screen 33. There are three of these filtering screens 33 arranged within the compartment 34 of the partition 27, the upper extremity of each of the screens being secured to a sleeve member 35 applied to a centrally arranged outlet pipe 36 which is open at the top to receive the overflow from the compartment 34 after the material has passed through the series of cone-shaped screens 33. The pipe 35 passes through an opening 37 in the bottom of the tank 7, its lower portion beyond the tank being equipped with a cut-off valve 38 which may be opened for the purpose of cleaning the tank 7 from any accumulation of any impurities that may exist. Between the valve 38 and the bottom of the tank 7 is connected an outlet pipe 39 which is in communication with the pipe 36 and receives the material from said pipe and delivers it into the tank 5, first discharging it upon a filtering screen 40. After passing through the screen 40 the material enters the compartment 41 of an outer annular partition 42 suitably spaced from the wall of the tank 5. The partition 42 is provided with openings 43 at the bottom, whereby the material which enters the compartment 41 passes into a compartment 44 between the partition 42 and the wall of the tank 5. The annular partition 42 rests upon a horizontal partition 45, whereby the outer portion of the compartment of the tank 5 is divided into upper and lower compartments, the latter being designated by the numeral 46. After the material enters the compartment 44 above the horizontal partition 45, it is free to pass downwardly through openings 47 at the outer edge of the partition 45 and into the compartment 46 which is arranged between the partition 47 and the bottom 48 of the tank 5. Resting upon the bottom 48 of the tank 5 is a number of annularly arranged partitions which I will designate respectively by the numbers 49, 50 and 51, which separate the central portion of the chamber of the tank 5 into a number of annular compartments respectively designated by the numerals 52, 53 and 54. The partitions 49 and 51 are open at the bottom to allow the material to freely enter the compartments 52 and 54 as it circulates through the tank 5 and preparatory to entering the upper open extremity of a central discharge pipe 55 which extends below the bottom 48 of the tank and is connected by means of an elbow 56 with a branch pipe member 57 which discharges pure water into a receptacle 58. It will be understood that when the mixture of oil and water reaches the compartments 44 and 46 of the main tank 5 that the oil will rise in these compartments while the water enters and successively passes through the compartments 52, 53 and 54. It should be explained that cold water is discharged into the compartment 46 from a circular pipe member 59 which extends around the annular partition 50 just above the openings in the bottom of the partition 49. This pipe member 59 has perforations in its upper portion through which the cold water is sprayed upwardly through the compartment 46, said water being supplied from a stand pipe 60, which passes upwardly and out through an opening in the top of the tank 5, the spraying into the compartment 46 from the pipe member 59 resulting in the final separation of the oil from the water, since the cooling of the material greatly facilitates the separation of these two substances.

Attention is called to the fact that the removable screen members 16, 17, and 18 of the filtering tank 6 extend unequally toward the top of the tank, the innermost member 16 being the shortest, the member 17 being next highest and the member 18 being the highest. By virtue of this construction and arrangement, in case one screen becomes clogged, the liquid may overflow into the next compartment without overflowing directly into the body of the tank around the outermost screen member 18, of which there would be a possibility when a considerable amount of liquid was passing through the filter if the screens were all of the same height.

From this it will be understood that the clogging of any screen or all of the screens will not prevent the operation of the device. Furthermore, the overflow of the liquid from one filtering compartment to another indicates to the person in charge of the plant that one or more of the screens is clogged and should be removed and a new one substituted.

Having thus described my invention, what I claim is:

1. A filtering tank provided with a central receiving partition and a number of filtering partitions spaced from the central partition and from each other to form filtering compartments arranged between the central compartment and the outlet, the body of the central partition being imperforate, the lower portion of the central compartment being in communication with the lower portion of the adjacent filtering compartment.

2. A filtering tank provided with a central receiving compartment which receives the material to be treated, said compartment being surrounded by a partition imperforate except at its lower end and a number of other compartments spaced from each other and from the central compartment, the said other compartments being surrounded by filtering members, the lower part of the innermost filtering compartment being in communication with the corresponding portion of the central compartment through the perforations in the lower end of the central partition.

3. A filtering tank provided with a central receiving compartment and a number of annularly arranged filtering compartments separated by filtering members, the innermost filtering compartment being spaced from the central compartment, the two compartments being in communication at the bottom.

4. A filtering tank having a number of annularly arranged filtering compartments positioned between a central receiving compartment and the outlet to the tank, the central compartment being formed by an imperforate partition open at the bottom to communicate with the adjacent filtering compartment, the filtering compartments being formed by readily removable filtering members.

5. A filtering tank having a number of annularly arranged filtering compartments positioned between a central receiving compartment and the outlet to the separating tank, the filtering tank having spaced filtering members which extend unequally toward the top of the tank, the top of the innermost being lowest and the other filtering members increasing in height outwardly toward the wall of the tank for the purpose set forth.

In testimony whereof I affix my signature.

HERMAN TEN WINKEL.

Copies of this patent may be obtained for five cents each, by addressing the "Commissioner of Patents, Washington, D. C."